United States Patent
Strandberg

(10) Patent No.: US 11,177,762 B2
(45) Date of Patent: Nov. 16, 2021

(54) ELECTRIC MOTOR CONTROL FOR PREVENTING TORQUE RIPPLE

(71) Applicant: Volvo Car Corporation, Gothenburg (SE)

(72) Inventor: Mats Strandberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 152 days.

(21) Appl. No.: 16/280,780

(22) Filed: Feb. 20, 2019

(65) Prior Publication Data

US 2020/0266753 A1 Aug. 20, 2020

(51) Int. Cl.
*H02P 29/50* (2016.01)
*B60L 15/20* (2006.01)
*B60W 10/08* (2006.01)

(52) U.S. Cl.
CPC .......... *H02P 29/50* (2016.02); *B60L 15/2009* (2013.01); *B60W 10/08* (2013.01)

(58) Field of Classification Search
CPC ................. B60L 15/20; B60L 15/2009; B60L 2240/423; B60L 2240/463; B60L 3/0023; H02P 29/50; B60W 10/08
See application file for complete search history.

(56) References Cited

U.S. PATENT DOCUMENTS

| 5,744,895 A * | 4/1998 | Seguchi | B60W 10/26 |
| | | | 310/266 |
| 6,025,691 A * | 2/2000 | Kawabata | B60L 15/025 |
| | | | 318/700 |
| 2002/0008430 A1* | 1/2002 | Tanaka | B62D 5/0403 |
| | | | 310/68 C |
| 2008/0140226 A1* | 6/2008 | Ev | G06F 30/15 |
| | | | 700/30 |

(Continued)

FOREIGN PATENT DOCUMENTS

EP 2597772 A1 5/2013
WO 2017183231 A1 10/2017

OTHER PUBLICATIONS

Plexim, "Electric Vehicle with Active Damping Algorithm," retrieved from https://www.plexim.com/support/application-examples/544 on Dec. 3, 2018, 3 pp.

(Continued)

*Primary Examiner* — Behrang Badii
*Assistant Examiner* — Daniel L Greene
(74) *Attorney, Agent, or Firm* — Shumaker & Sieffert, P.A.

(57) ABSTRACT

A control unit configured to control at least one motor of a vehicle is described that perform operations including receiving a target torque and a target speed for controlling the at least one motor, and determining, based on the target speed, a critical speed zone of the at least one motor. The critical speed zone defines a particular torque input to the at (Continued)

least one motor that induces torque ripple when the at least one motor is operating at any of a range of motor speeds. The operations performed by the control unit further include determining whether a current speed of the at least one motor is within the critical speed zone, and while determining that the current speed is within the critical speed zone, controlling a torque input to the at least one motor by avoiding the particular torque input defined by the critical speed zone.

20 Claims, 4 Drawing Sheets

(56) References Cited

U.S. PATENT DOCUMENTS

| | | | | |
|---|---|---|---|---|
| 2008/0156094 | A1* | 7/2008 | Holmes | D06F 33/48 |
| | | | | 73/462 |
| 2009/0234538 | A1* | 9/2009 | Ta | B62D 5/046 |
| | | | | 701/41 |
| 2013/0311029 | A1* | 11/2013 | Tagawa | B60W 30/1882 |
| | | | | 701/22 |
| 2015/0057866 | A1* | 2/2015 | Tseng | B60W 10/10 |
| | | | | 701/22 |
| 2016/0285331 | A1* | 9/2016 | Ichikawa | G01D 5/145 |
| 2019/0100114 | A1 | 4/2019 | Sawada et al. | |

OTHER PUBLICATIONS

Dollins, "FAQ: What are Ways to Avoid Torque Ripple in DC Motors," Motion Control Tips, Feb. 8, 2017, 3 pp.

Sibo et al., "A New Torque Ripple Test Method Based on PMSM Torque Ripple Analysis for Electric vehicles," EVS28 International Electric Vehicle Symposium and Exhibition, May 3-6, 2015,10 pp.

Extended Search Report from counterpart European Application No. 20158186.5, dated Aug. 12, 2020, 6 pp.

Response to Extended Search Report dated Aug. 12, 2020 from counterpart European Application No. 20158186.5, filed Mar. 3, 2021, 7 pp.

* cited by examiner

ELECTRIC MOTOR CONTROL FOR PREVENTING TORQUE RIPPLE

TECHNICAL FIELD

Techniques of this disclosure relate to electric motor controls, for example, in a full or hybrid electric powered vehicle.

BACKGROUND

Some electric machines, such as electric motors, experience "torque ripple." By definition, torque ripple is a periodic increase or decrease in output torque from an electric machine as a shaft of the electric machine rotates. Torque ripple may be quantified as a difference (e.g., percentage) in maximum and minimum torque output during one complete shaft revolution. Torque ripple may cause an electric machine to induce vibrations and/or produce audible noise, which may be undesirable, particularly for electric motors of electric or hybrid-electric vehicle propulsion systems.

SUMMARY

A drive train of an electric or hybrid-electric vehicle may control an electric motor in such a way as to cause torque ripple. Torque ripple from an electric motor may cause vibrations, audible noise, and other noise, vibration, and harshness (NVH) in a vehicle propulsion system. NVH may be particularly noticeable when a frequency of the torque ripple matches an eigenfrequency or natural frequency of other parts of the vehicle propulsion system. The amount of torque ripple may vary depending on several factors and can be reduced if not prevented via precise control of the electric motor.

The techniques of this disclosure may enable a motor controller to prevent or at least minimize unwanted torque ripple in an electric propulsion system. More specifically, the techniques describe ways that an example motor controller can vary the torque input to minimize torque ripple when the speed of an electric motor is within a critical speed zone where torque ripple is most likely to occur. As used in this disclosure, "a critical speed zone" defines a particular torque input (or range of torque inputs) that, if inputted to an electric motor, may induce torque ripple when the electric motor is operating at any of a range of "critical" motor speeds. For example, depending on a desired torque value (e.g., in newton-meters or similar unit), and a current speed, the motor controller may either dampen or accelerate the torque input to avoid having to maintain an electric motor torque, at a particular torque output that is associated with a critical speed zone, that encompasses the current speed. In other words, the motor controller may determine a torque value to avoid when controlling the electric motor to reach a target torque as the electric motor operates at a range of critical speeds.

In this way, through precise control of an electric motor during specific instances where torque ripple is more likely, an example motor controller may prevent torque ripple in an electric drive system. From avoiding particular torque outputs when operating in critical speed zones, an example motor controller may be configured to prevent torque ripple that would otherwise induce output torque pulsation frequencies that match an eigenfrequency or natural frequency of other parts the electric propulsion system. By preventing, or at least minimizing the amount of torque ripple, an electric drive system may operate with less NVH than other electric drive systems that do not actively avoid operating electric motors at particular torque outputs, particularly when operating within a range of critical speeds.

As one example, a method includes receiving, by a motor controller of a vehicle, a target torque and a target speed for controlling an electric motor of a vehicle; obtaining, by the motor controller a critical speed zone of the electric motor, the critical speed zone defining a particular torque input to the electric motor that induces torque ripple when the electric motor is operating at any of a range of motor speeds; determining, by the motor controller, whether a current speed of the electric motor is within the critical speed zone; and while determining that the current speed is within the critical speed zone, controlling a torque input to the electric motor by avoiding the particular torque input defined by the critical speed zone.

As another example, a vehicle includes at least one motor; a control unit configured to control the at least one motor, the control unit configured to: receive a target torque and a target speed for controlling the at least one motor; obtain a critical speed zone of the at least one motor, the critical speed zone defining a particular torque input to the at least one motor that induces torque ripple when the at least one motor is operating at any of a range of motor speeds; determine whether a current speed of the at least one motor is within the critical speed zone; and control, while the current speed is within the critical speed zone, a torque input to the at least one motor to avoid the particular torque input defined by the critical speed zone.

As another example, a computer-readable storage medium comprising instructions that, when executed by at least one processor of a computing device, cause the at least one processor to: receive a target torque and a target speed for controlling at least one motor of a vehicle; obtain a critical speed zone of the at least one motor, the critical speed zone defining a particular torque input to the at least one motor that induces torque ripple when the at least one motor is operating at any of a range of motor speeds; determine whether a current speed of the at least one motor is within the critical speed zone; and control, while the current speed is within the critical speed zone, a torque input to the at least one motor by avoiding the particular torque input defined by the critical speed zone.

As another example, a system includes means for receiving a target torque and a target speed for controlling at least one motor of a vehicle; means for obtaining a critical speed zone of the at least one motor, the critical speed zone defining a particular torque input to the at least one motor that induces torque ripple when the at least one motor is operating at any of a range of motor speeds; means for determining whether a current speed of the at least one motor is within the critical speed zone; and means for controlling, while the current speed is within the critical speed zone, a torque input to the at least one motor by avoiding the particular torque input defined by the critical speed zone.

The details of one or more examples are set forth in the accompanying drawings and the description below. Other features, objects, and advantages of the disclosure will be apparent from the description and drawings, and from the claims.

DETAILED DESCRIPTION

Figure 1:
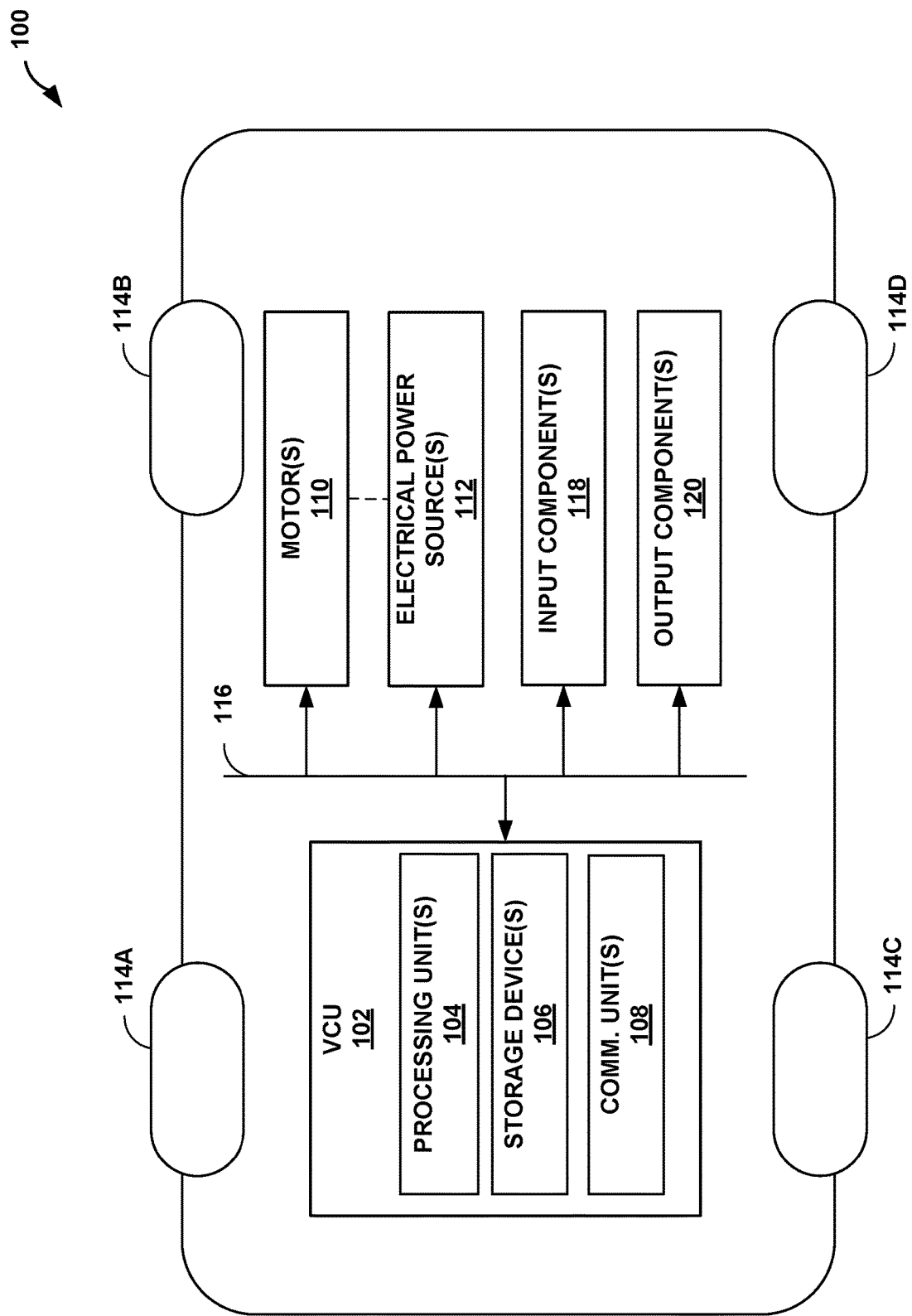
FIG. 1 is a conceptual diagram illustrating an example vehicle, in accordance with one or more aspects of the present disclosure.

FIG. 1 is a conceptual block diagram illustrating an example vehicle 100, in accordance with one or more techniques of this disclosure. Vehicle 100 may include any type of autonomous, semi-autonomous, or non-autonomous vehicle. Examples of vehicle 100 include cars, trucks, buses, motorcycles, recreational vehicles (RVs), tractors, all-terrain vehicles, watercraft, or any other type of vehicle. Vehicle 100 may be an electric vehicle (EV) or hybrid-electric vehicle (HEV).

As shown in FIG. 1, vehicle 100 includes at least one vehicle control unit (VCU) 102, one or more motors 110, one or more electrical power sources 112, one or more input components 118, and one or more output components 120. Motors 110 are physically coupled to wheels 114A-114D (collectively, wheels 114) to propel vehicle 100 along a vehicle pathway (e.g., a road). Motors 110 may include an internal combustion engine (ICE), one or more electric motors (EM), or a combination thereof (e.g., vehicle 100 may be a hybrid vehicle). In some examples, motors 110 receive electrical power from one or more electrical power sources 112 and/or provide electrical power to electrical power sources 112.

Electrical power sources 112 provide electrical power to one or more electrical components of vehicle 100, such as VCU 102, motors 110, an instrument cluster, display device, or any other component of vehicle 100 that utilizes electricity. Example electrical power sources 112 include an alternator, a capacitor, or a battery. In some examples, a battery may store approximately 12V to approximately 48V of electrical energy. In some examples, such as examples where vehicle 100 is a hybrid or fully electric vehicle, electrical power sources 112 may include a battery pack that includes a plurality of battery cells and may store hundreds or potentially thousands of volts.

Input components 118 obtain input (e.g., sensory input, user input, machine input, etc.) used by other components of vehicle 100, e.g., for controlling vehicle 100 or a component thereof. Examples of input components 118 include operator control devices (e.g., brake pedals, accelerator pedals, transmission clutch pedals, hand brakes, climate controls, entertainment controls, presence-sensitive input devices, buttons, knobs, switches, steering wheel, gear shift, or other human controllable input component) as well as sensory input devices (e.g., speedometer, barometer, radar system, moisture sensor, light sensor, microphone, and the like).

Output components 120 provide various types of output (e.g., sensory output, user interface output, machine output, etc.) to users, other components of vehicle 100, and/or other remote systems or machines. Some examples of output components 120 include operator feedback devices (e.g., lights, haptics, audible alert systems, feedback indicators, presence-sensitive displays, speakers, other display screens) and communication components (e.g., radios, transmitters, transceivers, and the like).

VCU 102 includes at least one processing unit 104, at least one storage device 106, and at least one communication unit 108. VCU 102 controls one or more systems of vehicle 100. As one example, VCU 102 may control one or more motors 110. In some examples, VCU 102 may represent any combination of an engine control unit, a transmission control unit, a powertrain control module, a brake control unit, a speed control unit, a motor controller, or a motor control unit, among others.

Processing unit 104 may be implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In some examples, storage device 106 may be a temporary memory, meaning that a primary purpose of storage device 106 is not long-term storage. Storage device 106 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 106 may include one or more non-transitory computer-readable storage devices. Storage device 106 may be configured to store larger amounts of information than typically stored by volatile memory. Storage device 106 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 106 may store program instructions and/or information (e.g., data) that, when executed, cause processing unit 104 to perform the techniques of this disclosure.

One or more communication units 108 of VCU 102 may communicate with other VCUs 102 of vehicle 100 and/or computing devices physically distinct from vehicle 100 (e.g., cloud computing devices). Communication units 108 include wired and/or wireless communication units. For example, communication units 108 of VCU 102 may transmit data and/or receive data via a Controller Area Network (CAN) bus that communicatively couples VCUs 102 and/or other various components of vehicle 100 (e.g., sensors). As another example, communication units 108 may include GPS radios, cellular (e.g., LTE) radios, Bluetooth™ radios, WiFi™ radios, or any other wireless radios.

Control network 116 may interconnect components 102, 110, 112, 118, and 120 for inter-component communications (physically, communicatively, and/or operatively). In some examples, control network 116 includes a system bus configured to exchange information or data between components 102 and 110. For example, control network 116 may exchange information between components 102 and 110 according to any communication protocol, such as a controller area network (CAN) bus protocol, media-oriented systems transport (MOST) protocol, transmission control protocol (TCP), among others. As one example, VCU 102 may output commands to motor 110 to control one or more operational characteristics (e.g., engine speed, throttle valve position, among others) of motor 110 via control network 116.

In accordance with techniques of this disclosure VCU 102 may control motor 110 to prevent motor 110 from inducing torque ripple in the output from motor 110. For example, VCU 102 may receive (e.g., as an input from an accelerator and/or brake pedal controller of input components 118) an indication of a target torque and a target speed for controlling motor 110 to provide propulsion or to brake vehicle 100 as vehicle 100 moves along a trajectory.

VCU 102 may obtain a critical speed zone of motor 110 for controlling motor 110 to reach the target torque. The critical speed zone may define a particular torque input (or range of torque inputs) that, if passed to motor 110 as input, may induce torque ripple when motor 110 is operating at any of a range of "critical" motor speeds. For example, a critical speed zone may define, for a high torque value (e.g., a maximum torque, a mid-level torque, or any other non-zero torque input), a range of critical speeds at which an output torque pulsation frequency associated with motor 110 may match the eigenmode frequency or natural frequency of other parts of vehicle 100. VCU 102 may determine the particular torque input defined by the critical speed zone is a torque input to avoid when controlling motor 110 to reach the target torque as motor 110 operates within the range of critical speeds that are defined by the critical speed zone.

In some examples, the critical speed zone may be determined via in-vehicle testing during a development phase (e.g., when vehicle 100 is being designed). As such, data representing the critical speed zone may be stored in vehicle 100 (e.g., by storage devices 106). VCU 102 may obtained the stored data to determine the critical speed zone. The critical speed zone may be influenced by several factors including, but not necessarily limited to, drive unit weight, rotational inertia of the gearbox, rotational stiffness of the gearbox, gearbox case bending stiffness, drive unit mount stiffness, half shaft rotational stiffness, internal electric motor design including rotor inertia, skew and pole count, and the like.

With the critical speed zone defined, VCU 102 may determine whether a current speed of motor 110 is within the critical speed zone. For example, VCU 102 may compare the current speed of motor 110 (e.g., as reported to VCU 102 by motor speed or as derived from a sensor input obtained from input components 118) to the range of critical speeds defined by the critical speed zone.

VCU 102 may continuously and dynamically evaluate whether the current speed of motor 110 is within the critical speed zone. While VCU 102 determines that the current speed of motor 110 is not within the critical speed zone, VCU 102 may control motors 110 as expected, without taking extra precautions to avoid torque ripple, by controlling the torque input of motors 110 to match the target torque.

If however VCU 102 determines that the current speed of motor 110 is within the critical speed zone, VCU 102 may control motor 110 with a focus on avoiding commanding motor 110 to the particular torque input that VCU 102 previously determined to avoid, when motor 110 is operating within the range of critical speeds. For example, while determining that the current speed is within the range of critical speeds of the critical speed zone, VCU 102 may adjust a torque input to motor 110 to command motor 110 towards the target torque while avoiding or refraining from commanding motor 110 to the particular torque input defined by the critical speed zone.

As one example, if the target torque is greater than the particular torque input being avoided, VCU 102 may increase the torque input of motor 110 to a value that is within a threshold of (e.g., just below, within a percent of, within a fixed value from) the particular torque input being avoided, until motor 110 can increase speed and exits the critical speed zone. VCU 102 may maintain the torque input below the particular torque input or torque input range being avoided, to let motor 110 catch-up, and increase in speed. When the current speed of motor 110 exceeds the range of critical speeds, VCU 102 may resume increasing the torque input to bring motor 110 up to the target torque level.

As another example, if the target torque is greater than the particular torque input being avoided, VCU 102 may, while motor 110 operates in the critical speed zone, increase the torque input of motor 110 more quickly when the torque input is within a threshold of (e.g., approximately equal to) the particular torque input being avoided. In other words, VCU 102 may increase the torque input of motor 110 with a rate of change that is greatest for torque input values near the particular torque input being avoided. VCU 102 may more quickly cause an increase in the torque input beyond the particular torque input being avoided so as to shorten the duration or amount of time that motor 110 operates near the particular torque input being avoided. In this way, VCU 102 may reduce the likelihood of causing any torque ripple or any noticeable NVH in other parts of vehicle 100.

As another example, if the target torque is less than the particular torque input being avoided, VCU 102 may set or increase the torque input of motor 110 to the target torque without having to perform any additional operations to avoid the particular torque input being avoided. In other words, VCU 102 may command motor 110 to produce a target torque when VCU 102 determines that the target torque is not likely to induce torque ripple into vehicle 100 given the current speed of motor 110.

In this way, through precise control of motor 110 during specific instances where torque ripple is more likely, VCU 102 may prevent torque ripple in vehicle 100. By preventing, or at least minimizing the amount of torque ripple, vehicle 100 may operate with less NVH than other electric drive systems that do not actively avoid operating electric motors in critical speed zones.

Figure 2:
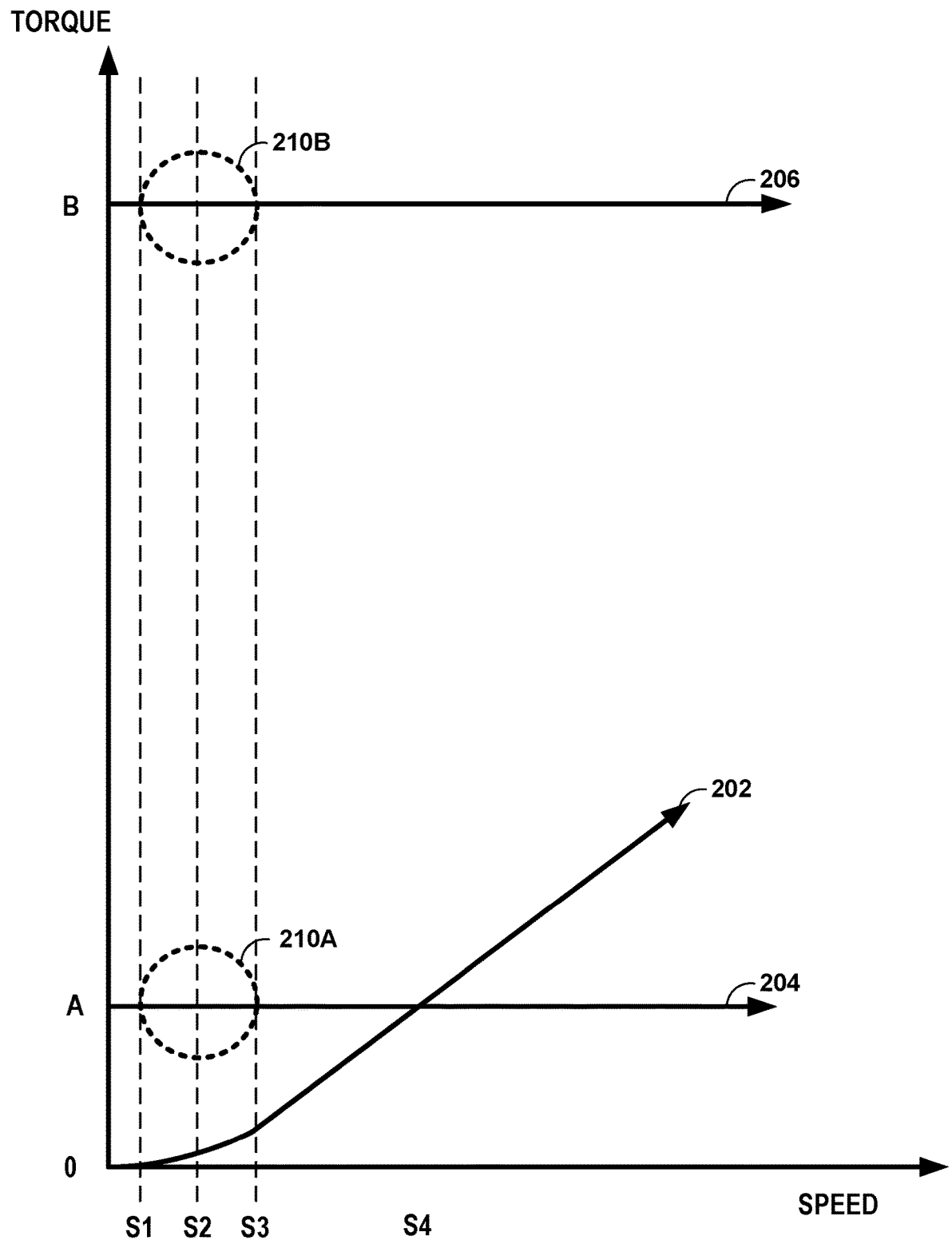
FIG. 2 is a line graph illustrating example torque control inputs given an increasing motor speed, in accordance with one or more aspects of the present disclosure.

FIG. 2 is a line graph illustrating example torque control inputs given an increasing motor speed, in accordance with one or more aspects of the present disclosure. FIG. 2 is described in the context of vehicle 100 of FIG. 1.

FIG. 2 shows torque inputs 202, 204, and 206 being commanded to at least one of motors 110 as motors 110 increase in speeds ranging from zero through S4. Also shown in FIG. 2 are two critical speed zones 210A and 210B which, for ease of description, each encompass a range of critical speeds S1 through S3.

Critical speed zones 210A and 210B each illustrate respective torque input regions that VCU 102 avoids when operating motors 110 over the range of critical speeds S1 through S3. For example, consider critical speed zone 210A which is approximately centred (plus or minus a threshold torque) about a particular torque input A, which in this example is a torque value greater than zero but less than the particular torque input B. Critical speed zone 210B is approximately centred (plus or minus a threshold torque) about a particular torque input B, which in this example is a torque value greater than the particular torque input A.

Critical speed zone 210A represents a region between speeds S1 and S3 where VCU 102 avoids commanding motors 110 to the particular torque input A. VCU 102 may take steps to avoid critical speed zone 210A, particularly when implementing an "eCreeper" function. For example, if vehicle 100 is an electric vehicle, VCU 102 may configure motor 110 to perform the eCreeper function to mimic the "creeper" gear of non-electric vehicles, by commanding motors 110 to propel vehicle 100 forward slowly, even though a driver is not pressing the accelerator pedal, e.g., in a parking lot or garage, in a slow moving queue in traffic, in a line at a stoplight, etc.

When vehicle 100 would otherwise remain stopped and idle, VCU 102 may implement eCreeper and command motors 110 to move forward slowly into and out of critical speed zone 210A. VCU 102 may command motors 110 to move beyond critical speed zone 210A (e.g., when motors 110 operate at speed S4); however if a driver presses a brake pedal, motor 110 can quickly revert back to operating within critical speed zone 210A. Unless VCU 102 avoids the particular torque input A as VCU 102 slows motors 110 and reverts back to operating in critical speed zone 210A, vehicle 100 may undergo NVH from torque ripple generated by motors 110 when VCU 102 causes the torque input to reach the particular torque input A.

In some examples, to mitigate NVH, VCU 102 may lower the torque request to motors 110 to be below the particular torque input A, before the speed of motors 110 falls below speed S3. Said differently, VCU 102 may vary the torque input when the speed of motors 110 changes from speed S4 to speed S3 so that the torque input is below or less than the particular torque input A by the time the speed of motors 110 is less than or equal to speed S3.

In some examples, in addition to controlling torque input, or as an alternative to controlling the torque input to mitigate NVH, VCU 102 may mitigate NVH by closely monitoring the speed of motors 110. VCU 102 may lower the torque request to motors 110 so that the speed of motors 110 remains outside the range of critical speeds. VCU 102 may command torque at motors 110 so that the resulting motor speed remains above speed S3 or below speed S1. For example, to mitigate NVH when pressing a brake pedal when the speed of motors 110 is at speed S4, VCU 102 may lower the torque request to motors 110 without letting the speed motors 110 fall to, or below, speed S3.

When the brake pedal is released, VCU 102 may restore the torque request back to that needed to implement the eCreeper function by increasing the torque request in a way that avoids requesting the particular torque input A, until after motors 110 have regained speed and exited critical speed zone 210A. In other words, responsive to determining that a target torque is within a threshold of the particular torque input A, VCU 102 may set a torque input to motors 110 to a value that is less than a value needed to command motors 110 to the target torque, until the current speed of motors 110 is outside critical speed zone 210A.

Critical speed zone 210B represents a region between speeds S1 and S3 where VCU 102 avoids commanding motors 110 to the particular torque input B. VCU 102 may ensure motors 110 avoid operating in critical speed zone 210B, especially during "two feet driver" conditions where a driver of vehicle 100 is working a brake pedal with one foot while working an accelerator pedal with another foot. This situation may occur, for example, if driver uses the brake pedal to keep the speed down while still demanding torque with the accelerator, for instance, when parallel parking on a grade, towing a boat trailer up or down a boat ramp, etc. During such types of driving conditions, VCU 102 may cause motor 110 to provide a large amount of torque to wheels 114, but at a low speeds, by commanding motors 110 towards the particular torque input B, even as vehicle 100 increases from zero to between speed S1 and speed S3.

Unless VCU 102 avoids the particular torque input B as motors 110 enter critical speed zone 210B, vehicle 100 may undergo NVH from torque ripple generated by motors 110 when VCU 102 causes the torque input to reach the particular torque input B. In some examples, to mitigate NVH, VCU 102 may lower the torque request to motors 110 to be below the particular torque input B, until the speed of motors 110 falls below speed S1 or increases beyond speed S3. Said differently, VCU 102 may vary the torque input when the speed of motors 110 is between speed S1 and speed S3 so that the torque input remains less than the particular torque input B when operating in critical speed zone 210B.

In some examples, in addition to controlling torque input, or as an alternative to controlling the torque input to mitigate NVH, VCU 102 may mitigate NVH by closely monitoring the speed of motors 110. VCU 102 may lower the torque request to motors 110 so that the speed of motors 110 remains outside the range of critical speeds of critical speed zone 210B. VCU 102 may command torque at motors 110 so that the resulting motor speed remains above speed S3 or below speed S1. For example, to mitigate NVH when a driver is pressing a brake and accelerator pedal simultaneously, VCU 102 VCU 102 may lower the torque request to motors 110 without letting the speed motors 110 reach speed S1 or may lower the torque without letting the speed fall to, or below speed S3. No matter how VCU 102 mitigates NVH, when the brake pedal is at a position that enables vehicle 100 to achieve sufficient acceleration and increase in speed beyond the critical speed zone 210B, VCU 102 may restore the torque request to motors 110 to correspond to the target torque request (e.g., the actual accelerator pedal request or derivative thereof).

Referring to torque input 202, in some examples, VCU 102 may mitigate NVH from torque ripple by controlling motor 110 so that either of critical speed zones 210A or 210B are avoided, as described above, or by minimizing time spend in either speed zone 210A and 210B. For example, VCU 102 may control the torque input to motors 110 as shown by torque input 202 by avoiding the particular torque inputs A and B that are defined by critical speed zones 210A and 210B. Specifically, VCU 102 may slowly increase torque input 202 until motors 110 speed up beyond speed S3, after which VCU 102 may increase torque input 202 to match the target torque.

In other examples, VCU 102, while determining that the current speed is within the range of critical speeds of critical speed zones 210A and 210B, may increase torque input 202 to the target torque at a rate that minimizes a duration of time during which the current speed is within either of critical speed zones 210A or 210B. Said differently, VCU 102 may cause the rate of change of target input 202 to be near maximum, when the speed of motors 110 is between speeds S1 and S2 and while torque input 202 is within a threshold of the particular torque inputs A or B. By minimizing the amount of time spent commanding motors 110 to the particular torque inputs A and B, when operating in a critical speed zone such as between speeds S1 and S3, VCU 102 may reduce the chance of inducing NVH into vehicle 100 from torque ripple.

Figure 3:
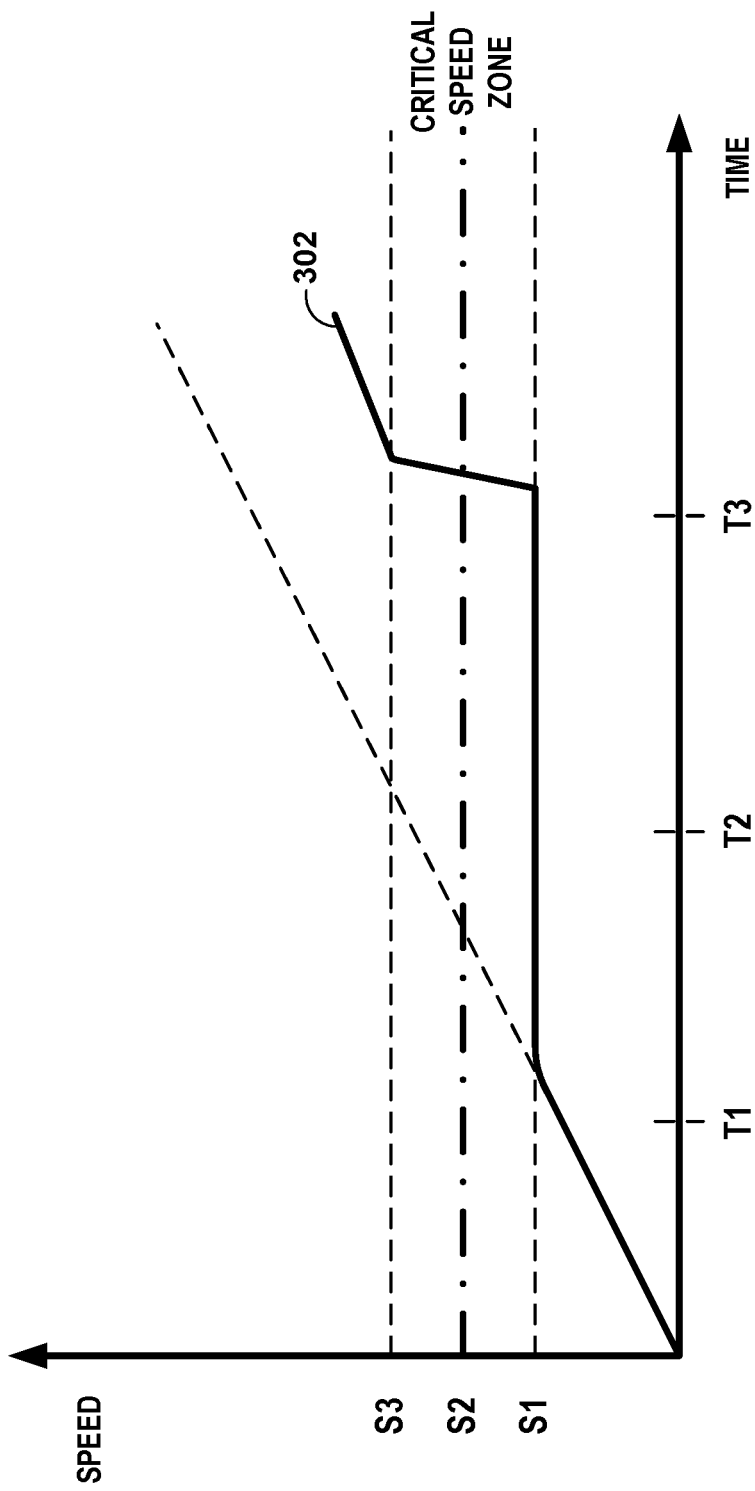
FIG. 3 is a graph illustrating example increases in motor speed over time, in accordance with one or more aspects of the present disclosure.

FIG. 3 is a line graph illustrating example increases in motor speed over time, in accordance with one or more aspects of the present disclosure. FIG. 3 is described in the context of vehicle 100 of FIG. 1.

FIG. 3 shows motor speed 302 from times zero to after time T3. Prior to time T1, VCU 102 may control motors 110 by applying torque inputs to achieve a target torque and cause an increase in motor speed 302.

VCU 102 may define a critical speed zone between motor speeds S1 through S3. VCU 102 may continuously or periodically evaluate whether motors 110 are operating in or around the critical speed zone.

One way that VCU 102 may try to mitigate NVH in vehicle 100 is to minimize the amount of time that motors 110 operate in critical speed zones. VCU 102 may determine if a commanded or target torque is different than a particular torque input defined by the critical speed zone. In cases where the target torque is greater than the particular torque and the current torque is less than the particular torque, VCU 102 may increase the torque input to cause motors 110 to achieve the target torque by increasing the torque input at a rate that minimizes a duration of time during which the current speed of motors 110 is within the critical speed zone. In other words, as shown at time T3, VCU 102 may increase the torque of motors 110 so that motors 110 very quickly increase from speed S1 to beyond speed S3.

Another way that VCU 102 may try to mitigate NVH in vehicle 100 is to prevent motors 110 from entering or passing through critical speed zones until vehicle 100 is ready to accept an increase in torque and/or increase in speed. For example, while VCU 102 implements an eCreeper function, a driver of vehicle 100 may press a brake pedal of input components 118. Given the current driving conditions, i.e., eCreeper triggered and brake pedal pressed, VCU 102 may infer that the driver does not want vehicle 100 to move as fast as the eCreeper function demands, and VCU 102 may therefore zero the torque input, or at least refrain from increasing the torque input of motor 110 to the target torque of the eCreeper function.

In trying to mitigate NHV while trying to maintain constant or a slower speed than the speed defined by the eCreeper function, VCU 102 may control the torque input of motors 110 to cause the current speed of motors 110 to be below the range of critical speeds defined by the critical speed zone, while a position of the brake pedal of the vehicle indicates the brake pedal is pressed. For example, at time T2, VCU 102 may control the torque of motors 110 to cause motor speed 302 to remain constant, at a level that is below the range of speeds S1 through S3 that define the critical speed zone of FIG. 3.

At time T3, the position of the brake pedal of the vehicle may indicate the brake pedal is released. To further mitigate NVH from torque ripple, VCU 102 may increase the torque input to the target torque defined by the eCreeper function, in response to determining, based on the position of the brake pedal, that the brake pedal is released. In other words, VCU 102 may enable motors 110 to speed up by increasing the torque input to motors 110 so that motors 110 operate for as little amount of time as possible in and around the critical speed zone from speeds S1 through S3. In some cases, VCU 102 may increase the torque input very quickly, whereas in other cases, VCU 102 may lessen the rate of increase, depending on various factors.

For example, in some examples, VCU 102 may determine, based on characteristics of the vehicle or driving conditions of the vehicle, a rate for increasing the torque input to the target torque. VCU 102 may increase the torque input of motors 110 at the determined rate for increasing the torque input to the target torque, for example, in response to determining the brake pedal is released. Examples of the characteristics of the vehicle may include: a vehicle weight, a vehicle orientation, tire air pressure, or the position of the brake pedal. Examples of driving conditions of the vehicle may include items such as an amount of road grade, outside temperature, barometric pressure, humidity, moisture level, and the like.

As an example, VCU 102 may determine the rate by comparing the electric motor rotational acceleration to a target acceleration. Based on the result of the comparison, VCU 102 may either add more torque request to accelerate quicker or remove torque request to minimize the torque ripple while still yielding the target acceleration.

Figure 4:
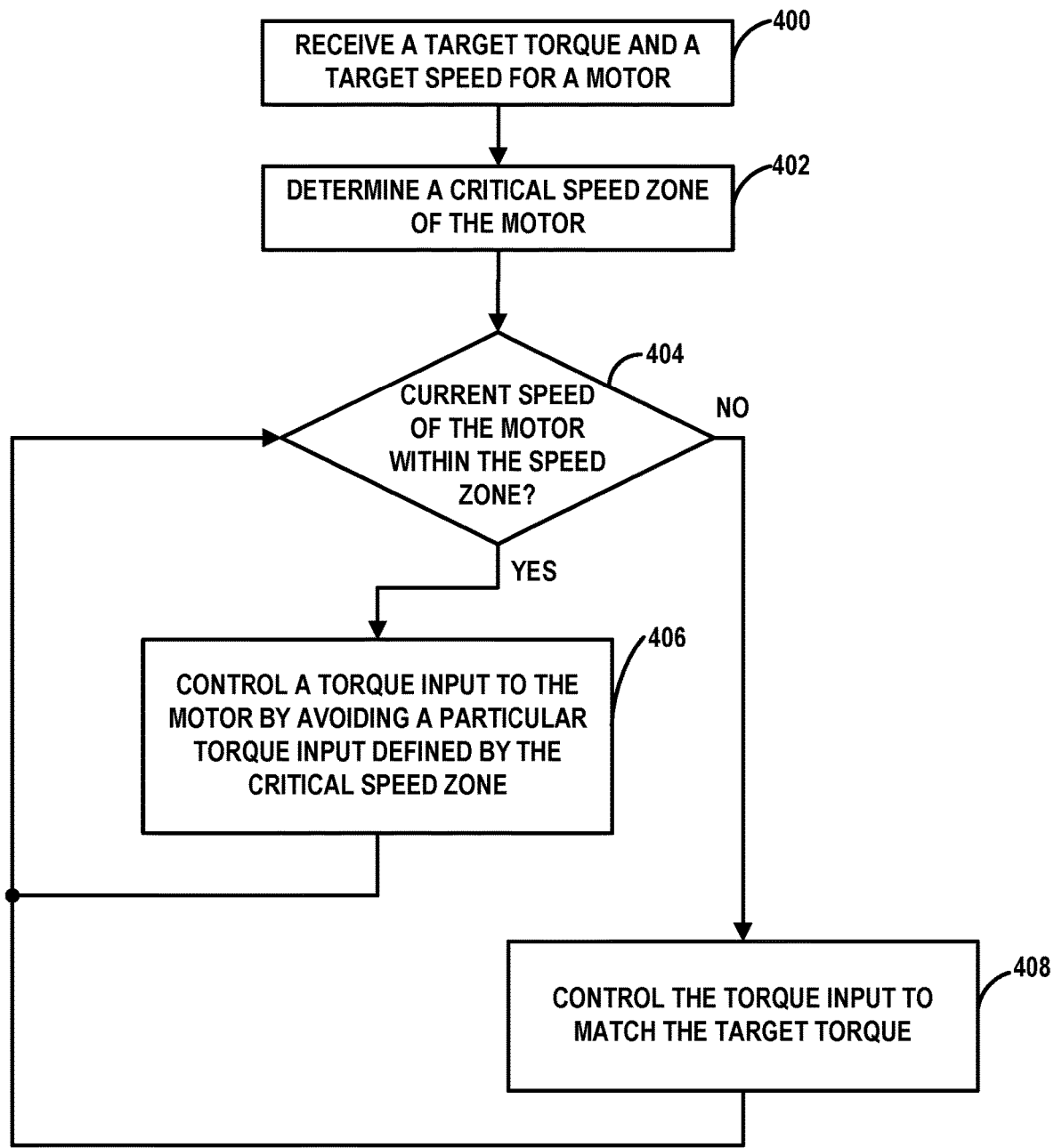
FIG. 4 is a flowchart illustrating example operations of an example computing device, in accordance with one or more aspects of the present disclosure.

FIG. 4 is a flowchart illustrating example operations of an example computing device, in accordance with one or more aspects of the present disclosure. FIG. 4 is described in the context of vehicle 100 of FIG. 1. For example, VCU 102 may perform operations 400-408 to control motors 110 so as to mitigate torque rippled induced NVH in vehicle 100.

In operation, VCU 102 may receive a target torque and a target speed for controlling an electric motor of a vehicle (400). For example, VCU 102 may receive information from a brake pedal or an accelerator pedal of input components 118, or from some other component of vehicle 100, that indicates to VCU 102 that motor 110 needs to be controlled to specific target torque and/or target speeds.

VCU 102 may determine, based at least in part on the target speed, a critical speed zone of the electric motor (402). For example, the critical speed zone may define a particular torque input to motors 110 that induces torque ripple when motors 110 are operating at any of a range of motor speeds. VCU 102 may determine a plurality of critical speed zones that specify unique torque values to avoid over respective ranges of critical speeds. VCU 102 may determine critical speed zones dynamically, based on inputs from input components 118. VCU 102 may be preprogrammed with the critical speed zones (e.g., in a factory or vehicle sales or service) predetermined to be associated with vehicle 100.

VCU 102 may determine whether a current speed of the electric motor is within the critical speed zone (404). In cases where the current speed is outside the critical speed zone (404, No branch), VCU 102 may control the torque input to the electric motor to match the target torque (408). For example, VCU 102 may cause motors 110 to speed up to the target speed by increasing the amount of torque commanded from motors 110. VCU 102 may set the torque input to match the target torque.

In other cases where the current speed is within the critical speed zone (404, Yes branch), VCU 102 may control the torque input to the electric motor by avoiding the particular torque input defined by the critical speed zone (406). For example, VCU 102 may set the torque input to match the target torque when the target torque is different than the particular torque input defined by the critical speed zone. For instance, in response to determining that a difference between the target torque and the particular torque input is greater than a threshold, VCU 102 may determine that motors 110 can be commanded to the target torque without concern for NVH. However, in response to determining that the difference between the target torque and the particular torque input is not greater than a threshold, VCU 102 may determine that motors 110 cannot be commanded to the target torque without concern for NVH and may either command motors 110 to a different torque level (e.g., above or below the particular torque input) or cause motors 110 to speed up or slow down to exit the critical speed zone. VCU 102 may repeat operations 404 through 408 if and when the target torque values, the target torque speeds, and the current motors speeds change.

The following examples may illustrate one or more aspects of the disclosure:

Example 1

A method comprising: receiving, by a motor controller of a vehicle, a target torque and a target speed for controlling an electric motor of a vehicle; obtaining, by the motor controller a critical speed zone of the electric motor, the critical speed zone defining a particular torque input to the electric motor that induces torque ripple when the electric motor is operating at any of a range of motor speeds; determining, by the motor controller, whether a current speed of the electric motor is within the critical speed zone; and while determining that the current speed is within the critical speed zone, controlling a torque input to the electric motor by avoiding the particular torque input defined by the critical speed zone.

Example 2

The method of example 1, wherein, controlling the torque input to the electric motor by avoiding the particular torque input defined by the critical speed zone, while determining that the current speed is within the critical speed zone, comprises: responsive to determining that the target torque is within a threshold of the particular torque input, setting, by the motor controller, the torque input to a value that is less than the target torque until the current speed is outside the critical speed zone.

Example 3

The method of any combination of examples 1-2, wherein the current speed is an initial speed, the method further comprising: determining, by the motor controller, whether a subsequent speed of the electric motor is within the critical speed zone; and while determining that the subsequent speed is not within the critical speed zone, controlling, the torque input to match the target torque.

Example 4

The method of any combination of examples 1-3, wherein, controlling the torque input to the electric motor by avoiding the particular torque input defined by the critical speed zone, while determining that the current speed is within the critical speed zone, comprises increasing, by the motor controller, the torque input to the target torque at a rate that reduces a duration of time during which the current speed is within the critical speed zone.

Example 5

The method of any combination of examples 1-3, wherein, controlling the torque input to the electric motor by avoiding the particular torque input defined by the critical speed zone, while determining that the current speed is within the critical speed zone, comprises: setting, by the motor controller, the torque input to match the target torque in response to determining that the target torque is different than the particular torque input.

Example 6

The method of example 5, further comprising: determining that the target torque is different than the particular torque input in response to determining that a difference between the target torque and the particular torque input is greater than a threshold.

Example 7

The method of any combination of examples 1-6, wherein, controlling the torque input to the electric motor by avoiding the particular torque input defined by the critical speed zone, while determining that the current speed is within the critical speed zone, comprises: in response to determining that the target torque exceeds the particular torque input: controlling, by the motor controller, the current speed of the electric motor to maintain the current speed at less than the range of motor speeds while a position of a brake pedal of the vehicle indicates the brake pedal is pressed; and increasing, by the motor controller, the torque input to the target torque in response to determining, based on the position of the brake pedal, that the brake pedal is released.

Example 8

The method of example 7, further comprising: determining, based on characteristics of the vehicle or driving conditions of the vehicle, a rate for increasing the torque input to the target torque, wherein the torque input is increased at the rate for increasing the torque input to the target torque in response to determining the brake pedal is released.

Example 9

The method of example 8, wherein at least one of: the characteristics of the vehicle comprise: a vehicle weight, a vehicle orientation, or the position of the brake pedal; or the driving conditions of the vehicle comprise a road grade.

Example 10

A vehicle comprising: at least one motor; a control unit configured to control the at least one motor, the control unit configured to: receive a target torque and a target speed for controlling the at least one motor; obtain a critical speed zone of the at least one motor, the critical speed zone defining a particular torque input to the at least one motor that induces torque ripple when the at least one motor is operating at any of a range of motor speeds; determine whether a current speed of the at least one motor is within the critical speed zone; and control, while the current speed is within the critical speed zone, a torque input to the at least one motor to avoid the particular torque input defined by the critical speed zone.

Example 11

The vehicle of example 10, wherein, to control the torque input to avoid the particular torque input defined by the critical speed zone, the control unit is configured to: set, responsive to determining that the target torque is different than the particular torque input, the torque input to match the target torque in.

Example 12

The vehicle of example 11, wherein the control unit is further configured to: determine that the target torque is different than the particular torque input in response to determining that a difference between the target torque and the particular torque input is greater than a threshold.

Example 13

The vehicle of any combination of examples 10-12, wherein, to control the torque input to avoid the particular torque input defined by the critical speed zone, the control unit is configured to: set, responsive to determining that the target torque is within a threshold of the particular torque input, the torque input to a value that is less than the target torque until the current speed is outside the critical speed zone.

Example 14

The vehicle of any combination of examples 10-13, wherein the current speed is an initial speed, and the control unit is further configured to: determine whether a subsequent speed of the electric motor is within the critical speed zone; and control, while determining that the subsequent speed is not within the critical speed zone, the torque input to match the target torque.

Example 15

The vehicle of any combination of examples 10-14, wherein, to control the torque input to avoid the particular torque input defined by the critical speed zone, the control unit is configured to: increase the torque input to the target torque at a rate that minimizes a duration of time during which the current speed is within the critical speed zone.

Example 16

The vehicle of any combination of examples 10-14, wherein, to control the torque input to avoid the particular torque input defined by the critical speed zone, the control unit is configured to: in response to determining that the target torque exceeds the particular torque input: control the current speed of the electric motor to maintain the current speed at less than the range of motor speeds while a position of a brake pedal of the vehicle indicates the brake pedal is pressed; and increase the torque input to the target torque in response to determining, based on the position of the brake pedal, that the brake pedal is released.

Example 17

The vehicle of example 16, wherein the control unit is further configured to: determine, based on characteristics of the vehicle or driving conditions of the vehicle, a rate for increasing the torque input to the target torque; and increase the torque input at the rate in response to determining the brake pedal is released.

Example 18

The vehicle of example 17, wherein at least one of: the characteristics of the vehicle comprise: a vehicle weight, a vehicle orientation, a vehicle position, or the position of the brake pedal; or the driving conditions of the vehicle comprise a road grade.

Example 19

A computer-readable storage medium comprising instructions that, when executed by at least one processor of a computing device, cause the at least one processor to: receive a target torque and a target speed for controlling at least one motor of a vehicle; obtain a critical speed zone of the at least one motor, the critical speed zone defining a particular torque input to the at least one motor that induces torque ripple when the at least one motor is operating at any of a range of motor speeds; determine whether a current speed of the at least one motor is within the critical speed zone; and control, while the current speed is within the critical speed zone, a torque input to the at least one motor by avoiding the particular torque input defined by the critical speed zone.

Example 20

The computer-readable storage medium of example 19, further comprising instructions that cause the at least one processor to perform the method of any combination of examples 1-9.

Example 21

A system comprising means for receiving a target torque and a target speed for controlling at least one motor of a vehicle; means for obtaining a critical speed zone of the at least one motor, the critical speed zone defining a particular torque input to the at least one motor that induces torque ripple when the at least one motor is operating at any of a range of motor speeds; means for determining whether a current speed of the at least one motor is within the critical speed zone; and means for controlling, while the current speed is within the critical speed zone, a torque input to the at least one motor by avoiding the particular torque input defined by the critical speed zone.

Example 22

The system of example 21, further means for performing the method of any combination of examples 1-9.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A control unit comprising: one or more processors configured to:

receive a target torque and a target speed for at least one electric motor of a vehicle, determine whether the target speed of the at least one electric motor of the vehicle is within a critical speed zone, the critical speed zone defining a particular torque input to the at least one electric motor that induces torque ripple when the at least one electric motor is operating at any of a range of motor speeds, wherein, to determine whether the target speed of the at least one electric motor of the vehicle is within the critical speed zone, the one or more processors are configured to: compare the target speed to a current speed of the at least one motor with the critical speed zone; and control, responsive to determining that the target speed is within the critical speed zone, a torque input to the at least one electric motor to avoid the particular torque input defined by the critical speed zone.

2. The control unit of claim 1, wherein, to control the torque input to avoid the particular torque input defined by the critical speed zone, the one or more processors are configured to:

set, responsive to determining that a target torque is within a threshold of the particular torque input, the torque input to a value that is less than the target torque until the current speed is outside the critical speed zone.

3. The control unit of claim 1, wherein the current speed is an initial speed, and the one or more processors are further configured to:

determine whether a subsequent speed of the electric motor is within the critical speed zone; and control, responsive to determining that the subsequent speed is not within the critical speed zone, the torque input to match a target torque.

4. The control unit of claim 1, wherein, to control the torque input to avoid the particular torque input defined by the critical speed zone, the one or more processors are configured to:

increase the torque input to a target torque at a rate that minimizes a duration of time during which the current speed is within the critical speed zone.

5. The control unit of claim 1, wherein the electric motor is configured to provide torque directly to a shaft, and wherein the vehicle does not include an additional electric motor configured to provide torque directly to the shaft.

6. The control unit of claim 1, wherein the vehicle does not include a combustion engine.

7. The control unit of claim 1, wherein, to control the torque input to avoid the particular torque input defined by the critical speed zone, the one or more processors are configured to:

set, responsive to determining that a target torque is different than the particular torque input, the torque input to match the target torque.

8. The control unit of claim 7, wherein the one or more processors are further configured to:

determine that the target torque is different than the particular torque input in response to determining that a difference between the target torque and the particular torque input is greater than a threshold.

9. The control unit of claim 1, wherein, to control the torque input to avoid the particular torque input defined by the critical speed zone, the one or more processors are configured to:

in response to determining that a target torque exceeds the particular torque input:

control the current speed of the electric motor to maintain the current speed at less than the range of motor speeds responsive to determining that a position of a brake pedal of the vehicle indicates the brake pedal is pressed; and increase the torque input to the target torque in response to determining, based on the position of the brake pedal, that the brake pedal is released.

10. The control unit of claim 9, wherein the one or more processors are further configured to:
determine, based on characteristics of the vehicle or driving conditions of the vehicle, a rate for increasing the torque input to the target torque; and
increase the torque input at the rate in response to determining the brake pedal is released.

11. The control unit of claim 10, wherein at least one of:
the characteristics of the vehicle comprise: a vehicle weight, a vehicle orientation, a vehicle position, or the position of the brake pedal; or
the driving conditions of the vehicle comprise a road grade.

12. A system comprising:
means for receiving a target torque and a target speed for least one electric motor of a vehicle,
means for determining whether a target speed of the at least one electric motor is within a critical speed zone, the critical speed zone defining a particular torque input to the at least one electric motor that induces torque ripple when the at least one electric motor is operating at any of a range of motor speeds,
wherein the means for determining comprises:
means for comparing the target speed to a current speed with the critical speed zone; and means for controlling, responsive to determining that the target speed is within the critical speed zone, a torque input to the at least one electric motor by avoiding the particular torque input defined by the critical speed zone.

13. A method comprising:
receiving a target torque and a target speed for least one electric motor of a vehicle,
determining whether the target speed of the at least one electric motor of a vehicle is within a critical speed zone, the critical speed zone defining a particular torque input to the at least one electric motor that induces torque ripple when the at least one electric motor is operating at any of a range of motor speeds,
wherein the determining comprises:
comparing the target speed to a current speed with the critical speed zone; and
responsive to determining that the target speed is within the critical speed zone, controlling a torque input to the at least one electric motor by avoiding the particular torque input defined by the critical speed zone.

14. The method of claim 13, wherein, controlling the torque input to the electric motor by avoiding the particular torque input defined by the critical speed zone comprises:
responsive to determining that a target torque is within a threshold of the particular torque input, setting, by the motor controller, the torque input to a value that is less than the target torque until the current speed is outside the critical speed zone.

15. The method of claim 13, wherein the current speed is an initial speed, the method further comprising:

determining, by the motor controller, whether a subsequent speed of the electric motor is within the critical speed zone; and
responsive to determining that the subsequent speed is not within the critical speed zone, controlling, the torque input to match a target torque.

16. The method of claim 13, wherein, controlling the torque input to the electric motor by avoiding the particular torque input defined by the critical speed zone comprises:
increasing, by the motor controller, the torque input to a target torque at a rate that reduces a duration of time during which the current speed is within the critical speed zone.

17. The method of claim 13, wherein, controlling the torque input to the electric motor by avoiding the particular torque input defined by the critical speed zone comprises:
setting, by the motor controller, the torque input to match a target torque in response to determining that the target torque is different than the particular torque input.

18. The method of claim 13, wherein, controlling the torque input to the electric motor by avoiding the particular torque input defined by the critical speed zone comprises:
in response to determining that a target torque exceeds the particular torque input:
controlling, by the motor controller, the current speed of the electric motor to maintain the current speed at less than the range of motor speeds responsive to determining that a position of a brake pedal of the vehicle indicates the brake pedal is pressed; and
increasing, by the motor controller, the torque input to the target torque in response to determining, based on the position of the brake pedal, that the brake pedal is released.

19. The method of claim 18, further comprising:
determining, based on characteristics of the vehicle or driving conditions of the vehicle, a rate for increasing the torque input to the target torque,
wherein the torque input is increased at the rate for increasing the torque input to the target torque in response to determining the brake pedal is released.

20. A non-transitory computer-readable storage medium comprising instructions that, when executed by at least one processor of a computing device, cause the at least one processor to:
receive a target torque and a target speed for least one electric motor of a vehicle,
determine whether the target speed of the at least one electric motor is within a critical speed zone, the critical speed zone defining a particular torque input to the at least one electric motor that induces torque ripple when the at least one electric motor is operating at any of a range of motor speeds,
wherein the instructions that cause the at least one processor to determine whether the target speed of the at least one electric motor is within the critical speed zone comprise instructions that cause the at least one processor to:
compare the target speed to a current speed with the critical speed zone; and
control, responsive to determining that the target speed is within the critical speed zone, a torque input to the at least one electric motor by avoiding the particular torque input defined by the critical speed zone.

* * * * *